US012478033B2

(12) United States Patent
Nakatani et al.

(10) Patent No.: US 12,478,033 B2
(45) Date of Patent: Nov. 25, 2025

(54) SYSTEM TOILET FOR PETS

(71) Applicant: Unicharm Corporation, Ehime (JP)

(72) Inventors: Misato Nakatani, Kanonji (JP); Yasuhiro Sasano, Kanonji (JP); Shinya Kaneko, Kanonji (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 18/659,619

(22) Filed: May 9, 2024

(65) Prior Publication Data

US 2024/0284868 A1    Aug. 29, 2024

Related U.S. Application Data

(63) Continuation of application No. PCT/JP2021/045128, filed on Dec. 8, 2021.

(30) Foreign Application Priority Data

Nov. 12, 2021  (JP) .................................. 2021-184794

(51) Int. Cl.
*A01K 1/01* (2006.01)
(52) U.S. Cl.
CPC .................................. *A01K 1/0114* (2013.01)
(58) Field of Classification Search
CPC ...... A01K 1/0114; A01K 1/011; A01K 1/033; A01K 1/034

(Continued)

(56) References Cited

U.S. PATENT DOCUMENTS

D227,269 S  *  6/1973  Sedgwick ...................... 119/503
6,135,057 A  * 10/2000  Cummings .......... A01K 1/0107
119/170

(Continued)

FOREIGN PATENT DOCUMENTS

EP        3216343 A2    9/2017
JP     2009-11176 A    1/2009

(Continued)

OTHER PUBLICATIONS

International Search Report issued in corresponding International Application No. PCT/JP2021/045128, dated Jan. 11, 2022, with translation (5 pages).

(Continued)

*Primary Examiner* — Joshua J Michener
*Assistant Examiner* — Nicole Paige Maccrate
(74) *Attorney, Agent, or Firm* — Osha Bergman Watanabe & Burton LLP

(57)  ABSTRACT

A system toilet for a pet includes an excretion container, including a liquid-permeable bottom surface portion, that houses toilet litter, a tray, disposed below the excretion container, that houses an absorbent sheet that absorbs liquid having passed through the liquid-permeable bottom surface portion, a lower container that holds the tray, and an upper container disposed to cover an upper part of the excretion container and having an opening portion through which a pet enters and exits. The upper container includes a pair of side wall portions disposed to face each other on both sides in a width direction of the opening portion and extending in a front-rear direction, an upper wall portion disposed above the opening portion to bridge over the pair of side wall portions, a lower wall portion disposed below the opening portion, and a side wall guide portion.

14 Claims, 7 Drawing Sheets

(58) Field of Classification Search
USPC .......................................... 119/165, 166, 482
See application file for complete search history.

(56) References Cited

U.S. PATENT DOCUMENTS

| | | | |
|---|---|---|---|
| 8,985,653 B1* | 3/2015 | Kest ..................... | A01K 1/0114 |
| | | | 294/1.3 |
| D728,172 S * | 4/2015 | Matsuo ....................... | D30/161 |
| 9,107,383 B2* | 8/2015 | Khalili ................. | A01K 1/0114 |
| 2009/0000556 A1* | 1/2009 | Matsuo ................ | A01K 1/0107 |
| | | | 119/161 |
| 2013/0019810 A1* | 1/2013 | Romano .............. | A01K 1/0114 |
| | | | 119/167 |
| 2020/0163306 A1 | 5/2020 | Takai et al. | |

FOREIGN PATENT DOCUMENTS

| | | |
|---|---|---|
| JP | 2020-22414 A | 2/2020 |
| JP | 2021-78412 A | 5/2021 |
| TW | 201909735 A | 3/2019 |

OTHER PUBLICATIONS

International Preliminary Report on Patentability issued in corresponding International Application No. PCT/JP2021/045128, mailed May 23, 2024 (6 pages).
Extended European Search Report issued in corresponding European Patent Application No. 21964148.7 mailed Aug. 13, 2025 (9 pages).

* cited by examiner

SYSTEM TOILET FOR PETS

BACKGROUND

Technical Field

One aspect of the present invention relates to a system toilet for pets.

Discussion of the Background

As a system toilet for pets, a configuration including an excretion container that houses toilet litter and has a liquid-permeable bottom surface portion, a tray that is disposed below the excretion container and accommodates an absorbent sheet that absorbs urine passing through the toilet litter, a lower container that holds the tray, and an upper container disposed above the excretion container is known (see, for example, Patent Literature 1). As such an upper container, there is a hood cover disposed so as to cover an upper opening of the excretion container. An opening portion through which a pet enters and exits is formed in a front surface portion of the hood cover.

PATENT LITERATURE

Patent Literature 1: Japanese Patent Publication No. 2021-78412

In a system toilet for pets provided with a hood cover, an entrance of a pet is limited to an opening portion of a front surface portion of the hood cover. When a pet enters the toilet from the opening portion, the body of the pet may hit a side wall portion or an upper wall portion forming the opening portion, and the pet may be injured. In addition, for example, as a hood cover type pet toilet that is not a system toilet, a pet toilet that does not have a liquid-permeable bottom surface portion but uses solidifying toilet litter is known. In such a toilet, if the lower container is not filled with a large amount of toilet litter (for example, an amount of filling the height of 5 cm (40%) of the lower container), the pet may be injured by hitting the abdomen against the lower wall portion when entering through the opening portion. Even if the toilet litter is filled in an amount filling the height of 5 cm (40%), the litter solidified with urination is removed. Therefore, the height of the litter is further reduced, and the rate of abdominal striking at the time of entering is increased.

SUMMARY

One or more embodiments relate to a system toilet for pets in which a pet can enter and exit without damaging the body.

A system toilet for pets according to one or more embodiments includes: an excretion container configured to house toilet litter and include a liquid-permeable bottom surface portion; a tray disposed below the excretion container and configured to house an absorbent sheet that absorbs a liquid having passed through the bottom surface portion; a lower container configured to hold the tray; and an upper container disposed so as to cover an upper part of the excretion container and formed with an opening portion through which a pet enters and exits, in which the upper container includes: a pair of side wall portions provided so as to face each other on both sides in a width direction of the opening portion and extending in a front-rear direction which is a depth direction of the upper container, an upper wall portion provided above the opening portion so as to bridge over the pair of side wall portions, a lower wall portion provided below the opening portion, and a side wall guide portion extending rearward and inward in the width direction so as to be folded back from a front end portion of the pair of side wall portions; and a part of region of the opening portion is defined by a rear end portion of the side wall guide portion.

In a system toilet for pets according to one or more embodiments, an opening portion through which a pet enters and exits is formed in an upper container covering an upper part of an excretion container. In addition, in the upper container, side wall guide portions extending rearward and inward in the width direction so as to be folded back are provided from a front end portion of a pair of side wall portions facing each other in the width direction of the opening portion and extending in the front-rear direction, and a part of a region of the opening portion is defined by a rear end portion of the side wall guide portions. Since such a system toilet for pets is configured to extend from the pair of side wall portions to the opening portion via the side wall guide portions, a pet entering the inside of the toilet from the side wall portions enters the inside of the toilet while moving the body along the side wall guide portions. For example, in a configuration in which the side wall guide portions are not provided, when a pet enters the toilet from the side wall portion, the body of the pet hits the side wall portion and the pet may be injured. In this respect, in the system toilet for pets according to one or more embodiments, since the side wall guide portions extending rearward and inward in the width direction are provided, the pet can enter the inside of the toilet while moving the body along the side wall guide portions with the surface, and it is possible to effectively suppress the pet from being injured. As described above, according to the system toilet for pets according to one or more embodiments, a pet can enter and exit without damaging the body. In addition, in the configuration in which the pet enters the inside of the toilet while moving the body along the side wall guide portions, since the pet can enter the inside of the toilet with an angle, it is not necessary to perform an angle change (turn) operation inside the toilet which is required when the pet does not enter the inside of the toilet with an angle, and it is possible to provide a toilet space comfortable for the pet. Further, since the side wall guide portions are provided, when the owner cleans the inside of the toilet, the arm of the owner put in the inside of the toilet hits not the side wall portion but the side wall guide portion with the surface, so that it is possible to suppress the arm of the owner from being damaged.

In the system toilet for pets described above, the side wall guide portion may be formed of the same member as the side wall portion. According to such a configuration, the side wall guide portion can be easily formed. That is, it is possible to easily obtain a toilet that does not damage the pet.

In the system toilet for pets described above, the side wall guide portion may be formed of a separate member from the side wall portion. According to such a configuration, for example, the side wall guide portion of the necessary material can be provided in the necessary portion in accordance with the characteristics of the pet. In addition, the side wall guide portion can be easily replaced.

In the system toilet for pets described above, an angle formed by the side wall portion and the side wall guide portion may be an obtuse angle. According to such a configuration, a structure in which the pet enters the toilet while moving the body along the side wall guide portion can be appropriately realized.

In the system toilet for pets described above, the upper container may further include: an upper wall guide portion extending downward from a lower end portion of the upper wall portion and a lower wall guide portion extending rearward from an upper end portion of the lower wall portion, the side wall guide portion, the upper wall guide portion, and the lower wall guide portion are continuously formed, and a region of the opening portion is defined by a rear end portion of the side wall guide portion, a lower end portion of the upper wall guide portion, and a rear end portion of the lower wall guide portion. As described above, since the upper wall guide portion and the lower wall guide portion are provided, for example, even for a pet that enters the toilet from the upper wall portion side or the lower wall portion side (a pet whose head, tail, or the like reaches the upper wall portion side or the lower wall portion side), the upper wall guide portion or the lower wall guide portion hits the tail or the like of the pet with the surface, and the body of the pet can be appropriately suppressed from being damaged.

In the system toilet for pets described above, the upper wall guide portion may be positioned behind the lower wall guide portion in the front-rear direction. As described above, since the upper wall guide portion is offset rearward, when the pet enters from the opening portion, the body and the tail are less likely to come into contact with the upper portion of the opening portion (upper wall guide portion), and it is possible to more effectively suppress the injury of the body of the pet.

In the system toilet for pets described above, the bottom surface portion of the excretion container may be located below an upper end portion of the opening portion. According to such a configuration, the bottom surface portion of the excretion container can be appropriately disposed in the area where the urine of the pet falls when the pet excretes while having only the upper body out of the opening portion.

In the system toilet for pets described above, a first virtual plane that is a virtual plane passing through a midpoint between an upper end portion of the opening portion and a rear end portion of the lower wall guide portion in the front-rear direction and is orthogonal to the front-rear direction may face the opening portion above a center of the opening portion in the vertical direction. According to such a configuration, since the region located on the front side in the side wall guide portion that defines the opening portion becomes large, the region in which the pet moves the body along the side wall guide portion can be enlarged. As a result, the timing at which the pet moves the face along the side wall guide portion and the timing at which the pet moves the body along the side wall guide portion are likely to be the same, so that the face does not collide with the guide portion earlier than the body of the pet as in the conventional product, and the face and the body come into contact with the guide portion at the same timing, so that it is possible to suppress injury of the pet.

In the system toilet for pets described above, a second virtual plane that is a virtual plane passing through a midpoint between an upper end portion of the opening portion and a front end portion of the lower wall portion in the front-rear direction and is orthogonal to the front-rear direction may face the opening portion above a center of the opening portion in the vertical direction. According to such a configuration, since the region located on the front side in the side wall guide portion that defines the opening portion becomes large, the region in which the pet moves the body along the side wall guide portion can be enlarged. As a result, the timing at which the pet moves the face along the side wall guide portion and the timing at which the pet moves the body along the side wall guide portion are likely to be the same, so that the face does not collide with the guide portion earlier than the body of the pet as in the conventional product, and the face and the body come into contact with the guide portion at the same timing, so that it is possible to suppress injury of the pet.

In the system toilet for pets described above, the side wall portion may extend from a position continuous with the lower wall portion toward a position continuous with the upper wall portion such that a front end portion of the side wall portion is inclined rearward, and a front end portion of the side wall portion may have an inflection point, a rising angle from the lower wall portion to the inflection point may be 30° or more and 90° or less, and a rising angle from the inflection point to the upper wall portion may be 60° or more and 90° or less. When the rising angle of the side wall portion to the inflection point is 30° or more, it is possible to appropriately guide the pet entering the toilet with the body along the side wall guide portion. When the angle of the side wall portion is 90° or less, the pet can easily enter the toilet from the side of the side wall portion.

In the system toilet for pets described above, an upper end portion of the opening portion may be located behind a midpoint between a central position of the tray and a front end portion of the lower wall portion in the front-rear direction. As described above, in the configuration in which an upper end portion of the opening portion is located sufficiently rearward, it is possible to detect contamination of the upper container and the like at an early stage even if the owner of the pet does not squat. In addition, the wide opening portion allows the owner to easily clean the upper container by putting his/her hand into the opening portion. Furthermore, according to such a configuration, since the region located on the front side in the side wall guide portion that defines the opening portion becomes large, the region in which the pet moves the body along the side wall guide portion can be enlarged. As a result, the timing at which the pet moves the face along the side wall guide portion and the timing at which the pet moves the body along the side wall guide portion are likely to be the same, so that the face does not collide with the guide portion earlier than the body of the pet as in the conventional product, and the face and the body come into contact with the guide portion at the same timing, so that it is possible to suppress injury of the pet.

In the system toilet for pets described above, a lower wall guide width that is a length of the lower wall guide portion in an extending direction toward the opening portion may be larger than a side wall guide width that is a length of the side wall guide portion in the extending direction toward the opening portion, and the side wall guide width may be larger than an upper wall guide width that is a length of the upper wall guide portion in an extending direction toward the opening portion. In this manner, by making the width wider as the region has the higher possibility that the pet puts the weight at the time of entry of the pet, it is possible to appropriately guide the pet and appropriately suppress the pet from being injured. Specifically, by making the lower wall guide width larger than the upper wall guide width, it is easy for the pet to place the legs on the lower wall guide portion when the pet enters, and it is possible to suppress collision of the head and the tail due to the thin upper wall guide portion.

In the system toilet for pets described above, at least one of the side wall guide width, the lower wall guide width, and the upper wall guide width does not necessarily need to be constant in size. According to such a configuration, the width can be adjusted so that the pet can easily moves the body according to the region, and the pet can more easily enter the toilet.

In the system toilet for pets described above, an angle formed by the upper wall portion and the upper wall guide portion may be an obtuse angle. According to such a configuration, it is possible to realize a structure in which the pet is appropriately guided in the opening portion direction by the upper wall guide portion. Then, when the pet enters the toilet, for example, when the tail comes into contact with the toilet, the pet comes into contact with the upper wall guide portion with a surface instead of a point, so that it is possible to appropriately suppress the pet from being injured.

In the system toilet for pets described above, the upper container may further include a protruding portion at an outer end portion in the width direction of the lower wall portion. According to such a configuration, when the pet enters the toilet from the left or right of the opening portion (the outer edge in the width direction), the protruding portion can be used as a step of hooking the legs of the pet, and the pet can more easily enter the toilet.

In the system toilet for pets described above, the upper container may be configured to include a fixed hood disposed on a rear side, a movable hood disposed on a front side, and a pair of coupling portions rotatably coupling the movable hood to the fixed hood, the fixed hood may include a pair of connecting portions extending forward from a place where the pair of coupling portions is provided, and a lower wall first portion extending in the width direction so as to connect front end portions of the pair of connecting portions, and the movable hood may include a lower wall second portion disposed in front of the lower wall first portion, and the lower wall guide portion may be disposed so as to overlap the lower wall first portion, and the lower wall portion may be formed by disposing the lower wall second portion in front of the lower wall first portion. Since the lower wall portion has the double structure as described above, the pet can be stably supported by the lower wall portion, and the pet can more easily enter the toilet.

In the system toilet for pets described above, the lower wall first portion may include a region protruding toward the opening portion side from the lower wall guide portion in a planar view in a state where the lower wall guide portion is overlapped with the lower wall guide. As a result, when the weight of the pet is put on the lower wall guide portion, the lower wall guide portion can be appropriately supported by the lower wall first portion, and the lower wall guide portion can be prevented from being bent and the pet can be prevented from slipping the legs. In addition, since the lower wall guide portion is supported by the lower wall first portion, the pet can be stably excreted with the legs placed on the lower wall guide portion when excreting facing the entrance side.

According to the system toilet for pets according to one or more embodiments, a pet can enter and exit without damaging the body.

DESCRIPTION OF THE EMBODIMENTS

Figure 1:
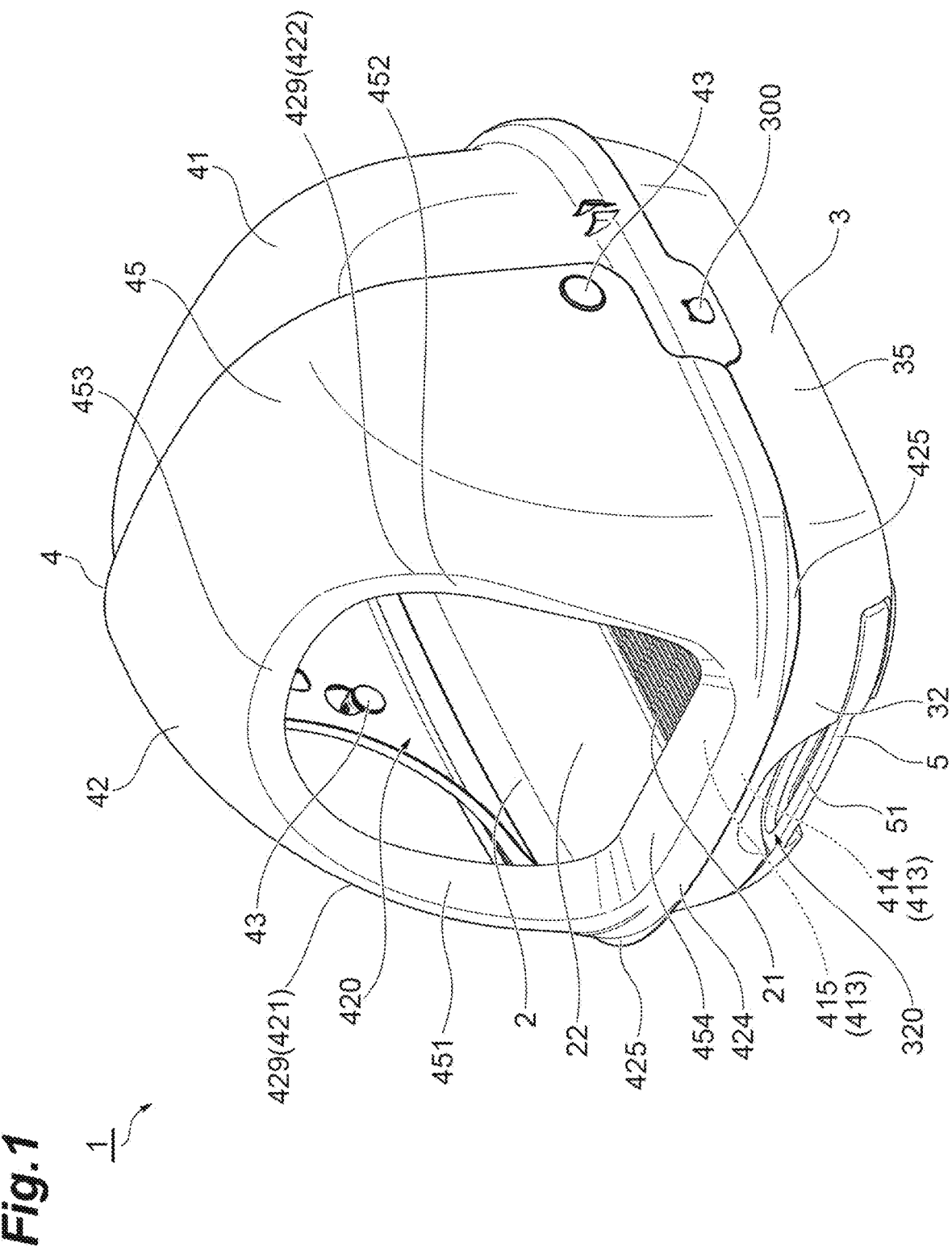
FIG. 1 is a perspective view of a closed state of a system toilet for pets according to one or more embodiments.

Hereinafter, a system toilet for pets according to one or more embodiments will be described in detail with reference to the drawings. In the drawings, the same or corresponding parts are denoted by the same reference numerals, and redundant description will be omitted. Note that the drawings are schematic, and ratios of dimensions and the like may be different from actual ones.

Figure 2:
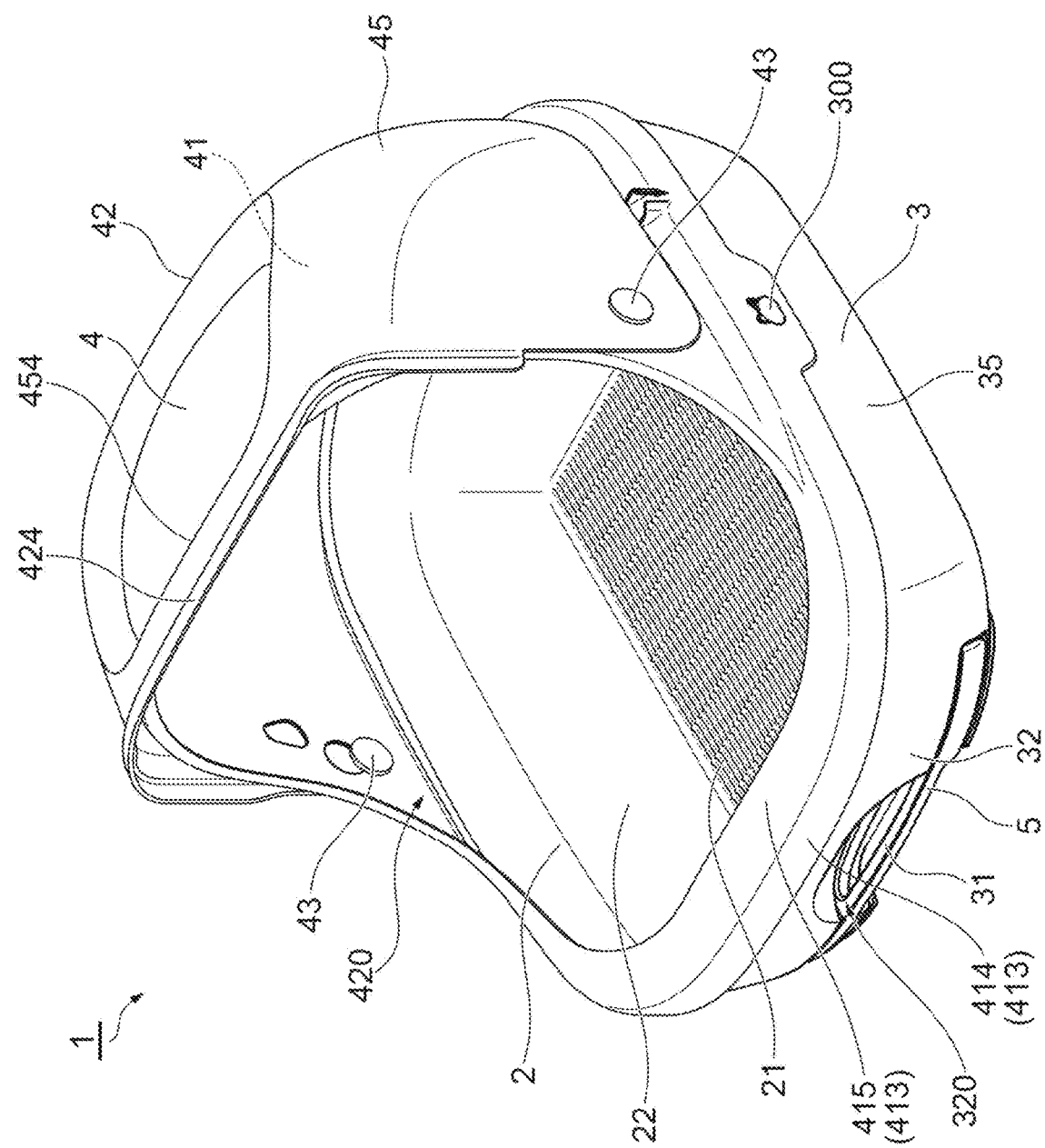
FIG. 2 is a perspective view of an open state of the system toilet for pets according to one or more embodiments.
Figure 3:
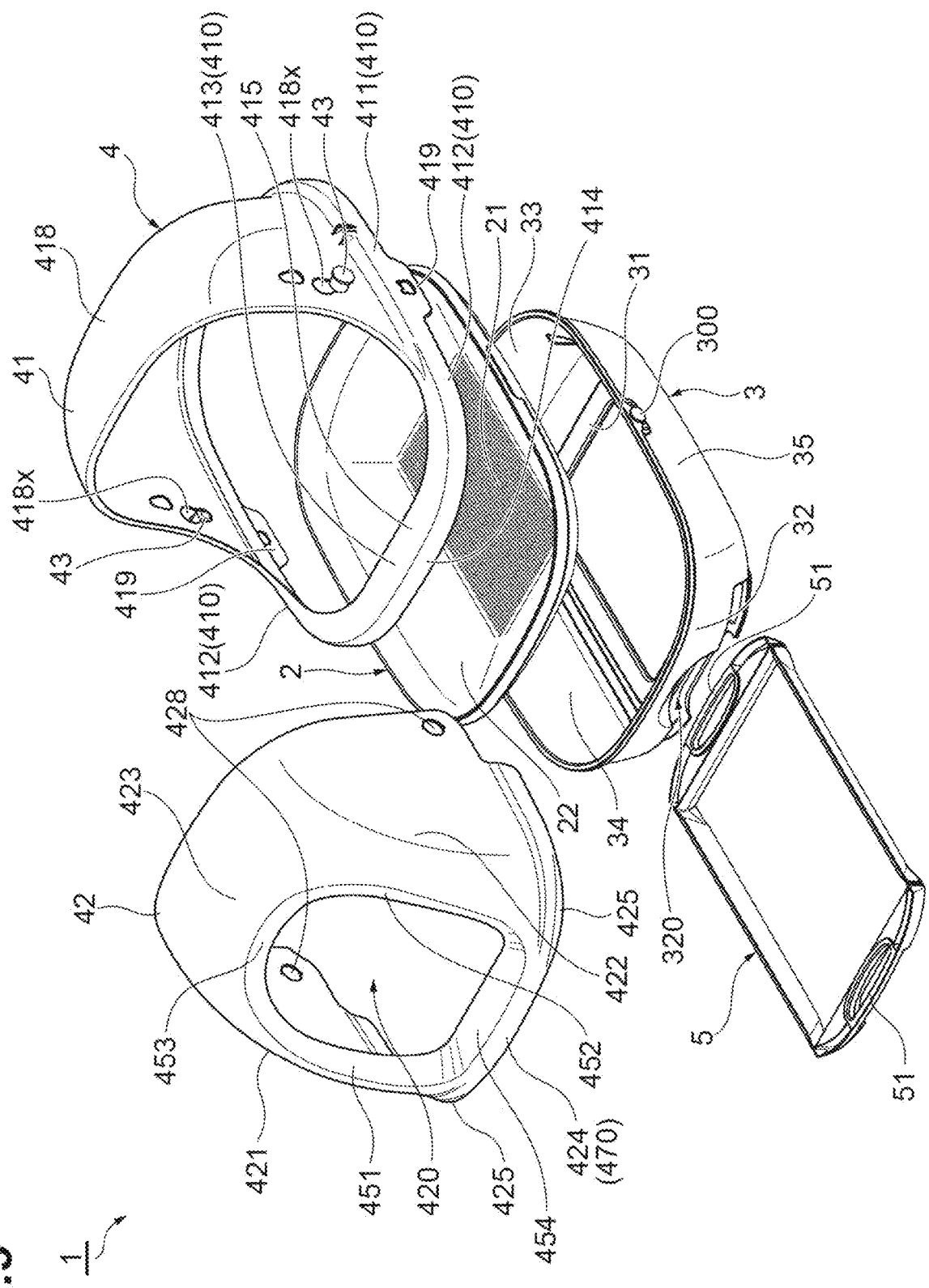
FIG. 3 is an exploded perspective view of the system toilet for pets illustrated in FIG. 1.

FIG. 1 is a perspective view of a closed state of a system toilet for pets 1 according to one or more embodiments (details will be described later). FIG. 2 is a perspective view of an open state of the system toilet for pets 1 according to one or more embodiments (details will be described later). FIG. 3 is an exploded perspective view of the system toilet for pets 1 illustrated in FIG. 1. The system toilet for pets 1 according to one or more embodiments is, for example, a system toilet for excretion of a cat that is a pet. The system toilet for pets of one or more embodiments may be a system toilet for excretion of a pet other than a cat.

As illustrated in FIGS. 1 to 3, the system toilet for pets 1 includes an excretion container 2, a lower container 3, a hood 4 (upper container), and a tray 5. The "closed state" illustrated in FIG. 1 is a state in which the hood 4 is closed, and the "open state" illustrated in FIG. 2 is a state in which the hood 4 is open (details will be described later).

Hereinafter, there is a case where a vertical direction of the system toilet for pets 1 is referred to as a "vertical direction", a depth direction which is a longitudinal direction is referred to as a "front-rear direction", and a direction orthogonal to the vertical direction and the front-rear direction is referred to as a "width direction". In the "vertical direction", a description will be given assuming that a direction toward the hood 4 side as viewed from the lower container 3 is "upper", and a direction toward the lower container 3 side as viewed from the hood 4 is "lower". Further, in the "front-rear direction", a description will be given assuming that a direction toward a movable hood 42 side (details will be described later) of the hood 4 illustrated in FIG. 1 as viewed from a fixed hood 41 (details will be described later) is "front", and a direction toward the fixed hood 41 side as viewed from the movable hood 42 illustrated in FIG. 1 is "rear".

The excretion container 2 is a container for housing toilet litter (not illustrated). The excretion container 2 has a liquid-permeable bottom surface portion 21 and a wall surface 22. The toilet litter is a granular material capable of absorbing or permeating a liquid such as urine. The toilet litter is formed by molding, for example, bentonite that covers feces and can absorb liquid, wood or paper coated with water repellent coating, or zeolite, silica gel, mineral or the like having deodorizing power into a substantially spherical shape having a diameter of about several mm to several cm, and known toilet litter may be used. When solidifying sand is used as toilet litter, the liquid-permeable bottom surface portion 21 may be clogged. Therefore, solidifying sand may not be adopted in the present system toilet for pets 1. The toilet litter is arranged on the bottom surface portion 21.

The bottom surface portion 21 is a plate-shaped member having bars formed in a duckboard-like shape and having regular gaps between the bars. The bottom surface portion 21 is formed in a substantially rectangular shape in a planar view. The wall surface 22 is a portion formed to rise upward from the peripheral edge of the bottom surface portion 21. That is, the wall surface 22 is formed so as to rise upward from both end portions in the front-rear direction and both end portions in the width direction of the bottom surface portion 21. Note that the bottom surface portion 21 may have a shape other than a rectangular shape in a planar view as long as toilet litter can be stored therein. The excreta excreted by the pet passes through the toilet litter, passes through the gap of the bottom surface portion 21 formed by the duckboard-like shaped bars, and falls into the lower container 3 (specifically, the tray 5 held in the lower container 3) disposed below the excretion container 2. The excretion container 2 is formed of, for example, a resin such as plastic, but is not limited thereto.

The tray 5 is disposed below the excretion container 2 and accommodates an absorbent sheet (not illustrated) that absorbs liquid (excrement) that has passed through the bottom surface portion 21. On the front side of the tray 5, a tray handle portion 51 that can be pulled out toward the front side by a user's hand is formed. The tray handle portion 51 may be formed not only on the front side but also on the rear side of the tray 5. In this case, the tray 5 has a front-back symmetrical shape. In this manner, since the tray 5 has a front-rear symmetrical shape and the tray handle portion 51 is formed on both the front side and the rear side, it is possible to pull out the tray 5 through the tray handle portion 51 even if the front and rear of the tray 5 are switched, for example. The region in which the liquid is absorbed in the absorbent sheet is determined to some extent. By switching the front and rear of the tray 5, the orientation of the absorbent sheet is changed, and the liquid can be absorbed in a region different from the region in which the liquid has already been absorbed. In this manner, by switching the front and rear of the tray 5, one absorbent sheet can be effectively used to the maximum. The tray 5 is formed to be slightly smaller than the lower container 3 so as to be housed inside the lower container 3 and to be able to swing. The tray 5 is pulled out in the horizontal direction in one or more embodiments, but is not limited thereto, and may be pulled out obliquely upward, for example.

The lower container 3 is a container that holds the tray 5. The lower container 3 houses the tray 5 so that the tray 5 can swing to be pulled out inside the lower container 3. As illustrated in FIG. 3, the lower container 3 includes a bottom surface portion 31 and wall surfaces 32, 33, 34, and 35. The bottom surface portion 31 is a portion facing an installation surface on which the system toilet for pets 1 is installed. The bottom surface portion 31 is formed in a rectangular shape in a planar view. A central portion of the bottom surface portion 31 may be an opening.

The wall surface 32 is a portion formed to rise upward from a front end portion of the bottom surface portion 31. The wall surface 32 is formed with an opening 320 for drawing out the tray 5. The wall surface 33 is a portion formed to rise upward from a rear end portion of the bottom surface portion 31. The wall surfaces 34 and 35 are portions formed to rise upward from the both end portions in the width direction of the bottom surface portion 31. The wall surfaces 32, 33, 34, and 35 are continuously formed, and the entire periphery of the bottom surface portion 31 is surrounded by the wall surfaces 32, 33, 34, and 35. The wall surface 22 of the excretion container 2 is fitted to upper end portions of the wall surfaces 32, 33, 34, and 35. In addition, the fixed hood 41 of the hood 4 is attached so as to cover upper end portions of the wall surfaces 32, 33, 34, and 35 (details will be described later). A coupling portions 300 and 300 coupled to the hook 419 of the fixed hood 41 are provided at a central portion and an upper end portion in the front-rear direction of the wall surfaces 34 and 35 (details will be described later).

The hood 4 is disposed so as to cover an upper part of the excretion container 2, and an opening portion 420 through which a pet enters and exits is formed. The hood 4 includes a fixed hood 41, a movable hood 42, and a pair of coupling portions 43 and 43. The fixed hood 41 is disposed at a position covering an upper part of the rear side of the excretion container 2. In the closed state illustrated in FIG. 1, the movable hood 42 is disposed at a position covering the upper part of the front side of the excretion container 2.

The fixed hood 41 and the movable hood 42 have a portion 45 (see FIG. 1) overlapping each other in the vicinity of the center of the excretion container 2 in the front-rear direction. A pair of coupling portions 43 and 43 rotatably coupling the movable hood 42 to the fixed hood 41 is disposed at a lower end portion of the overlapping portion 45. The pair of coupling portions 43 and 43 extends inward from both end portions sides in the width direction so as to penetrate the movable hood 42 and the fixed hood 41, and rotatably couples the movable hood 42 to the fixed hood 41. The movable hood 42 is not limited to the rotation, and may have a shape that slides while the movable hood 42 is in contact with the fixed hood 41.

The closed state is a state in which the movable hood 42 is disposed at a position covering the upper front side of the excretion container as illustrated in FIG. 1. The open state is a state in which the movable hood 42 is disposed on the rear side (fixed hood 41 side) as illustrated in FIG. 2. When the movable hood 42 rotates about the pair of coupling portions 43 and 43, the open state and the closed state can be switched. Since the movable hood 42 rotates and moves on the outer surface of the fixed hood 41, the fixed hood 41 is slightly smaller than the movable hood 42.

As illustrated in FIG. 3, the fixed hood 41 includes an attachment portion 410 and a hood portion 418. The attachment portion 410 is a portion attached to the upper end portions of the wall surfaces 32, 33, 34, and 35 of the lower container 3. The attachment portion 410 includes a rear attachment portion 411, a pair of connecting portions 412 and 412, and a lower wall first portion 413.

The rear attachment portion 411 is a portion attached to an upper end portion of the rear portion of the wall surfaces 34 and 35 and the upper end portion of the wall surface 33. The rear portion of the wall surfaces 34 and 35 is, for example, a portion behind the center in the front-rear direction. The positions of the front end portions of the rear attachment portion 411 on the wall surface 34 side and the wall surface 35 side in the front-rear direction substantially coincide with the positions where the pair of coupling portions 43 and 43 is provided. Hooks 419 and 419 extending downward are provided at a front end portion of a portion of the rear attachment portion 411 attached to the wall surfaces 34 and 35. The fixed hood 41 is attached and fixed to the lower container 3 by coupling the hooks 419 and 419 to the coupling portions 300 of the wall surfaces 34 and 35, respectively.

The pair of connecting portions 412 and 412 extends forward from front end portions (that is, the portions where the pair of coupling portions 43 and 43 is provided in the front-rear direction) of the rear attachment portions 411 attached to wall surfaces 34 and 35, respectively. The pair of connecting portions 412 and 412 is attached to upper end portions of front portions of the wall surfaces 34 and 35.

The lower wall first portion 413 extends in the width direction so as to connect front end portions of the pair of connecting portions 412 and 412. The lower wall first portion 413 is attached to an upper end portion of the wall surface 32. The lower wall first portion 413 includes a first portion 414 extending in the vertical direction along the front surface portion of the wall surface 32 and extending in the width direction, and a second portion 415 extending rearward from an upper end portion of the first portion 414 and extending in the width direction. In the closed state, as illustrated in FIG. 1, a lower wall guide portion 454 (details will be described later) of the movable hood 42 is disposed so as to overlap the lower wall first portion 413. Specifically, the lower wall guide portion 454 is disposed so as to overlap the second portion 415 of the lower wall first portion 413, and a lower wall second portion 424 (details will be described later) of the movable hood 42 is disposed in front of the first portion 414 of the lower wall first portion 413.

Returning to FIG. 3, the hood portion 418 is a hood that covers the upper part of the rear side of the excretion container 2. The hood portion 418 rises upward from substantially the entire region of the rear attachment portion 411 and covers the upper portion of the rear side of the excretion container 2. The hood portion 418 is formed of a substantially arcuate surface whose upper surface is a curved surface curved from the front end portion side toward the rear end portion side. Through holes 418x through which the pair of coupling portions 43 and 43 passes are formed at front end portion of both side surface portions of the hood portion 418. The position of the through hole 418x in the front-rear direction substantially coincides with the hook 419.

Figure 4:
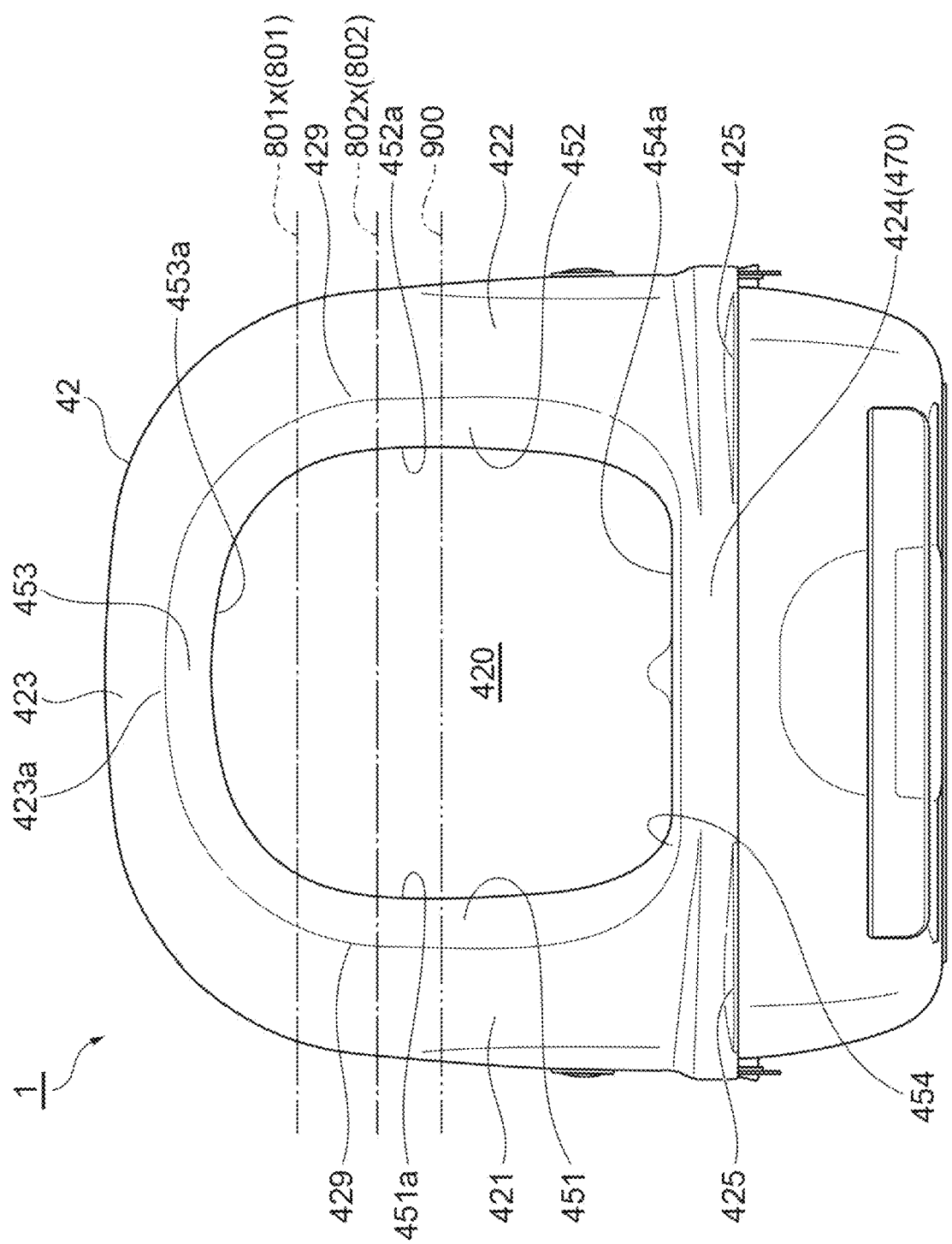
FIG. 4 is a front view of the system toilet for pets illustrated in FIG. 1.
Figure 5:
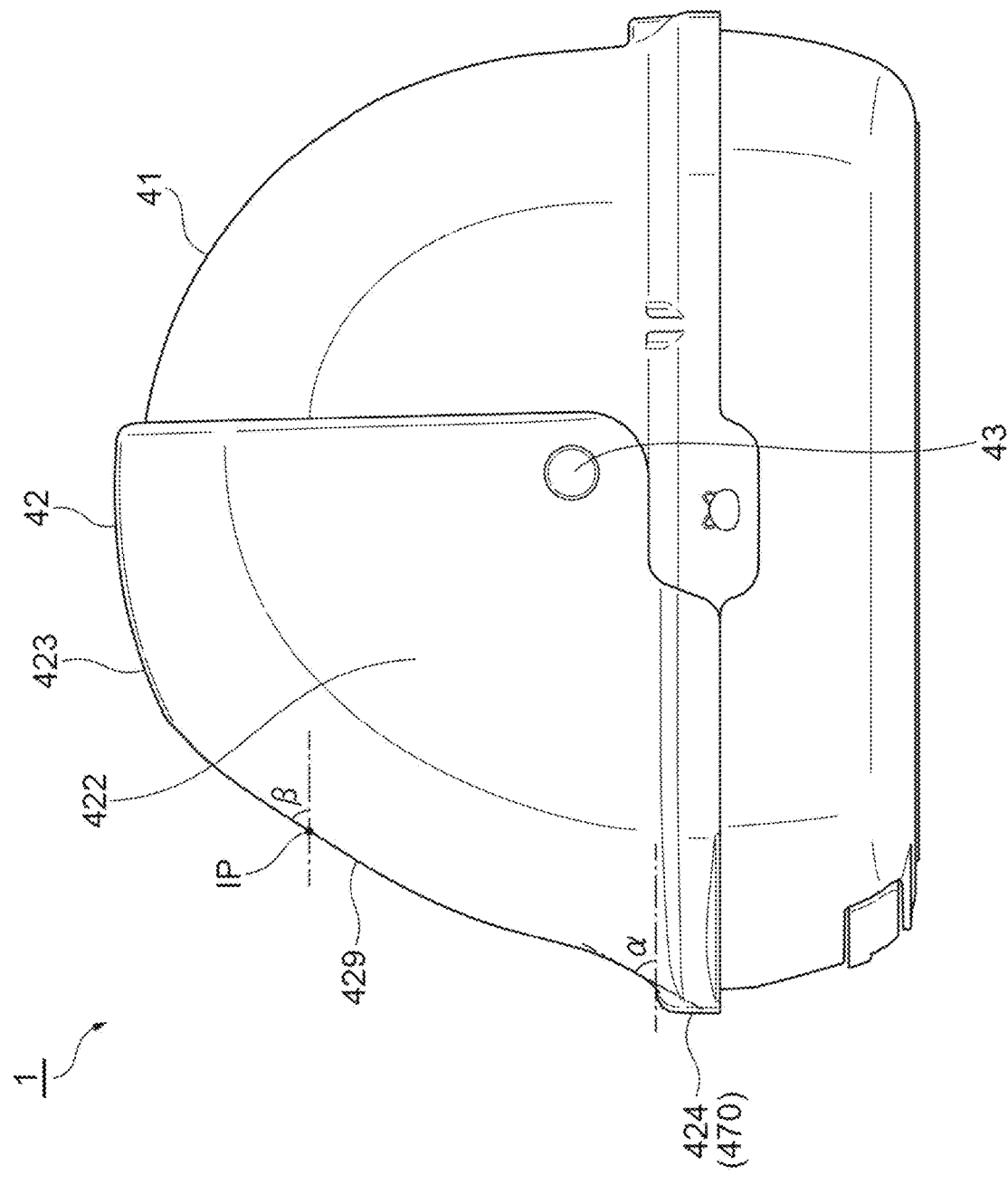
FIG. 5 is a side view of the system toilet for pets illustrated in FIG. 1.
Figure 6:
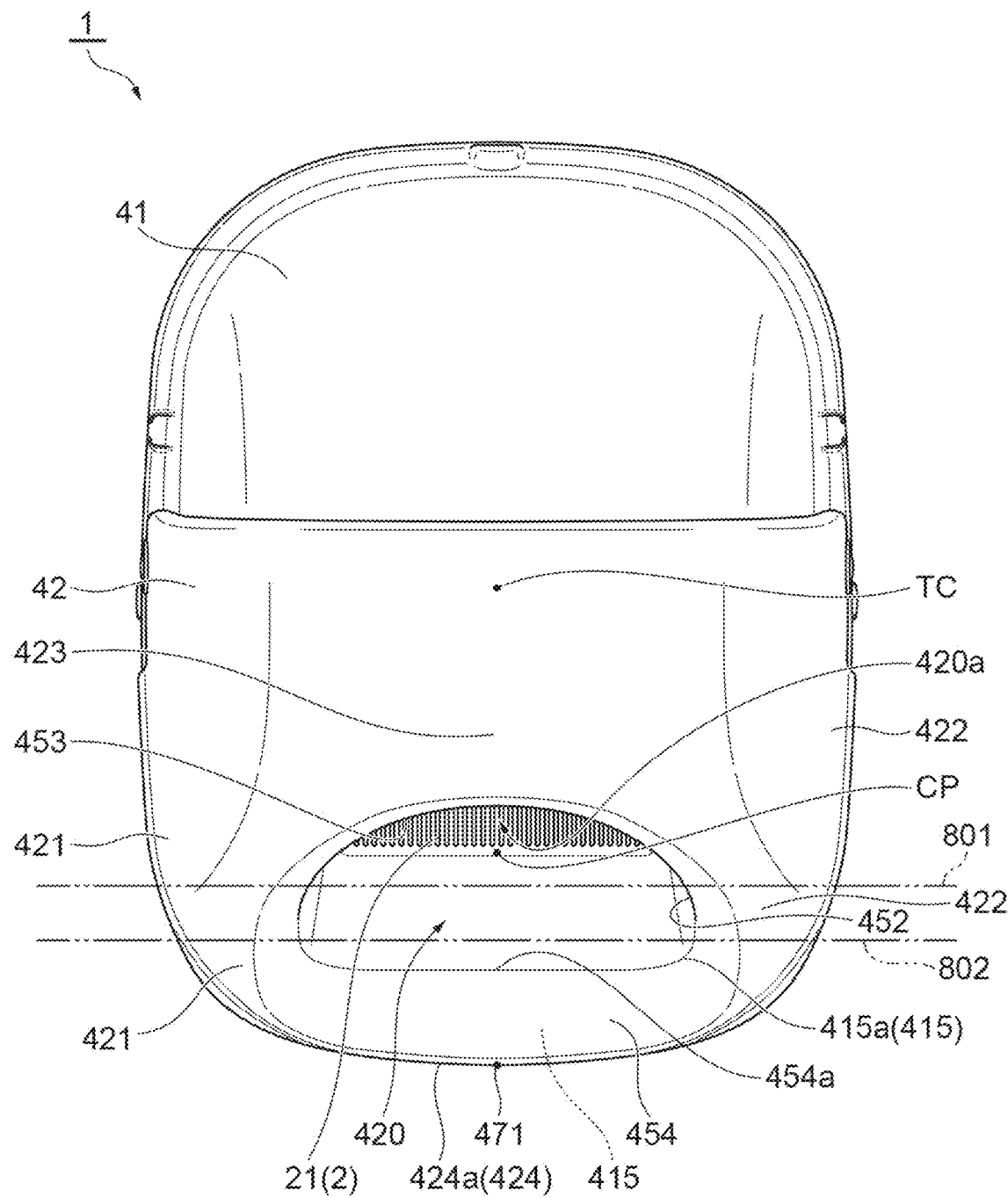
FIG. 6 is a plan view of the system toilet for pets illustrated in FIG. 1.

The movable hood 42 is configured to be switched between a closed state (see FIG. 1) and an open state (see FIG. 2) by rotating about the pair of coupling portions 43 and 43. A detailed configuration of the movable hood 42 will be described with reference to FIGS. 4 to 6. FIG. 4 is a front view of the system toilet for pets 1 in a closed state. FIG. 5 is a side view of the system toilet for pets 1 in a closed state. FIG. 6 is a plan view of the system toilet for pets 1 in a closed state.

The movable hood 42 is formed with the opening portion 420 for allowing a pet to enter and exit on a front surface thereof. The movable hood 42 includes a pair of side wall portions 421 and 422, an upper wall portion 423, the lower wall second portion 424, a protruding portion 425, side wall guide portions 451 and 452, an upper wall guide portion 453, and a lower wall guide portion 454. These components included in the movable hood 42 are integrally formed of the same member.

The pair of side wall portions 421 and 422 is provided so as to face each other at both end portions in the width direction of the opening portion 420, and is a portion extending in the front-rear direction. As illustrated in FIGS. 4 and 6, the side wall portions 421 and 422 are formed of a curved surface that is curved so as to expand outward in the width direction from the front end portion side toward the rear end portion side. A through hole 428 (see FIG. 3) through which the pair of coupling portions 43 and 43 passes is formed at a rear end portion and a lower end portion of the side wall portions 421 and 422.

As illustrated in FIG. 5, the side wall portions 421 and 422 extend from a position continuous with the lower wall second portion 424 toward a position continuous with the upper wall portion 423 such that a front end portion 429 is inclined rearward. As illustrated in FIG. 5, the front end portion 429 of the side wall portions 421 and 422 has an inflection point IP, and a rising angle α from the lower wall second portion 424 to the inflection point IP is, for example, 30° or more and 90° or less, and may be, for example, 60° to 80°, and is, for example, 60°. In addition, a rising angle β from the inflection point IP to the upper wall portion 423 is, for example, 60° or more and 90° C. or less, and is, for example, 60°. Note that the position of the inflection point IP may be a position corresponding to two central regions when the opening portion 420 is divided into four in the vertical direction, and may be a position corresponding to an upper region of the two central regions. In a case where the inflection point IP is set at an excessively low position, the guide portion of the side wall is configured to extend short at a low position, and there is a possibility that the side wall cannot sufficiently serve as a guide. That is, since the guide portion is at a low position, there is a possibility that the pet cannot properly place the body. In addition, in a case where the inflection point IP is set at an excessively high position, since the side wall portions 421 and 422 are configured not to be inclined backward on the entrance side, there is a possibility that it becomes difficult for the pet to enter the toilet. In this regard, by setting the position of the inflection point IP to the above-described central position in the vertical direction, it is possible to provide a configuration in which the pet is appropriately guided and the pet easily enters.

The upper wall portion 423 is a portion provided above the opening portion 420 so as to bridge over the pair of side wall portions 421 and 422. As illustrated in FIG. 5, the upper wall portion 423 is formed of a substantially arcuate surface which is a curved surface curved from the front end portion side toward the rear end portion side.

The lower wall second portion 424 is provided below the opening portion 420. The lower wall second portion 424 is a portion that extends in the vertical direction and in the width direction along the front surface portion of the lower wall first portion 413 in the closed state. The lower wall second portion 424 is continuous with the pair of side wall portions 421 and 422 at both end portions in the width direction. As described above, in the closed state, the lower wall second portion 424 is disposed in front of the lower wall first portion 413. By arranging the lower wall second portion 424 in front of the lower wall first portion 413, a lower wall portion 470 is formed by the lower wall first portion 413 and the lower wall second portion 424.

As illustrated in FIG. 3, the protruding portion 425 is provided at an outer edge portion in the width direction of the lower wall second portion 424 constituting the lower wall portion 470, and is a portion protruding outward of the lower wall second portion 424. More specifically, the protruding portion 425 is provided at a lower end of a portion of the lower wall second portion 424 continuous with the pair of side wall portions 421 and 422, and protrudes outward from the lower wall second portion 424 and the side wall portion 421 (or the side wall portion 422). The protruding portion 425 is a portion gripped by the user when the movable hood 42 is rotated, for example, at the time of switching from the closed state to the open state. That is, when the user lifts the protruding portion 425, the movable hood 42 rotates to switch from the closed state to the open state. Furthermore, the protruding portion 425 may be used as a step of hooking the legs of the pet when the pet enters the toilet from the left or right of the opening portion 420 (outer edge in the width direction). In addition, when the movable hood 42 is held in the open state, it can be used as a system toilet having a wide opening portion. In this case, a cat can block the view at the time of urination but feel a sense of openness at the time of entry. In addition, conventionally, even if it is used in a closed state, it can be used in an optimum form such as holding in an open state according to a change in the state of a cat, such as an obese cat, an old cat, or a cat having a disorder.

As described above, since the front end portion 429 of the side wall portions 421 and 422 extends so as to be inclined rearward from the portion continuing to the lower wall second portion 424 toward the portion continuing to the upper wall portion 423 (see FIG. 5), the opening portion 420 is formed so as to be positioned more rearward toward the upper end portion side as illustrated in FIG. 1 and the like. As illustrated in FIG. 6, the bottom surface portion 21 of the excretion container 2 is located below an upper end portion 420a of the opening portion 420. Below the upper end portion 420a of the opening portion 420, a tray 5 (specifically, the recessed portion other than the tray handle portion 51 in the tray 5) may be positioned, and an absorbent sheet or a urine discharge member (a urine discharge tray or the like) may be present. Further, as illustrated in FIG. 6, the upper end portion 420a of the opening portion 420 may be located behind a midpoint CP between a central position TC of the tray 5 and a front end portion 471 of the lower wall portion 470 in the front-rear direction.

As illustrated in FIG. 1, the side wall guide portions 451 and 452 are portions extending rearward and inward in the width direction so as to be folded back from the front end portions 429 of the pair of side wall portions 421 and 422. That is, the side wall guide portion 451 extends so as to be folded back from the front end portion 429 of the side wall portion 421, and the side wall guide portion 452 extends so as to be folded back from the front end portion 429 of the side wall portion 422. As illustrated in FIG. 4, a rear end portion 451a of the side wall guide portion 451 and a rear end portion 452a of the side wall guide portion 452 define a part of a region of the opening portion 420, specifically, regions on both end portions sides in the width direction of the opening portion 420. That is, the entire region sandwiched between the rear end portion 451a of the side wall guide portion 451 and the rear end portion 452a of the side wall guide portion 452 is a region of the opening portion 420. The angle formed by the side wall portion 421 and the side wall guide portion 451 and the angle formed by the side wall portion 422 and the side wall guide portion 452 are both obtuse angles, and are, for example, about 100° to 125°. The width of the side wall guide portions 451 and 452 (the length of the side wall guide portions 451 and 452 in the extending direction toward the opening portion 420) is not constant, and for example, may be made relatively large on the side close to the lower wall guide portion 454 and relatively small on the side close to the upper wall guide portion 453. The width of the side wall guide portion 451 and 452 is, for example, about 27 mm to 43 mm.

The upper wall guide portion 453 is a portion extending downward from the lower end portion 423a of the upper wall portion 423. The upper wall guide portion 453 is formed continuously with the side wall guide portions 451 and 452. As illustrated in FIG. 4, a part of the region of the opening portion 420, specifically, a region on the upper side of the opening portion 420 is defined by the lower end portion 453a of the upper wall guide portion 453. The upper wall guide portion 453 extends downward at an angle different from the curved surface of the upper wall portion 423 such that the lower end portion 423a of the upper wall portion 423 becomes an inflection point. The angle formed by the upper wall portion 423 and the upper wall guide portion 453 is an obtuse angle, and is, for example, about 100° to 125°. The width of the upper wall guide portion 453 (the length in the extending direction toward the opening portion 420 of the upper wall guide portion 453) is not constant, and for example, may be relatively small at the central portion in the width direction and relatively large at both end portions in the width direction. The width of the upper wall guide portion 453 is, for example, about 25 mm to 27 mm. As illustrated in FIG. 6, the upper wall guide portion 453 is positioned behind the lower wall guide portion 454 in the front-rear direction.

As illustrated in FIG. 6, the lower wall guide portion 454 is a portion extending rearward from the upper end portion 424a of the lower wall second portion 424 constituting the lower wall portion 470. The lower wall guide portion 454 extends rearward toward the opening portion 420 without being inclined (that is, substantially horizontally). As a result, the pet entering from the opening portion 420 can easily put the legs on the lower wall guide portion 454, and can easily enter the toilet. In addition, for example, in a case where the lower wall guide portion 454 is inclined downward in a direction away from the opening portion 420, there is a possibility that litter falling from the legs of the pet to the lower wall guide portion 454 may roll down to the floor outside the toilet. However, since the lower wall guide portion 454 is substantially horizontal as described above, such a situation can be suppressed. In addition, in a case where the owner detaches the hood 4 from the lower container 3 and holds the hood 4 in a flipped state, the lower wall guide portion 454 is substantially horizontal, so that it is possible to suppress urine spray and dust attached to the back side of the hood 4 from falling onto the floor.

The lower wall guide portion 454 linearly extends in the width direction and is formed continuously with the side wall guide portions 451 and 452. As illustrated in FIG. 6, a part of the region of the opening portion 420, specifically, a region on the lower side of the opening portion 420 is defined by the rear end portion 454a of the lower wall guide portion 454. The angle formed by the lower wall second portion 424 and the lower wall guide portion 454 is an obtuse angle, and is, for example, about 95° to 100°. In addition, the angle formed by the lower wall second portion 424 and the lower wall guide portion 454 is not necessarily be an obtuse angle. The width of the lower wall guide portion 454 (the length in the extending direction toward the opening portion 420 of the lower wall guide portion 454) is not constant, and for example, may be relatively large at the central portion in the width direction and relatively small at both end portions in the width direction. The width of the lower wall guide portion 454 is, for example, about 43 mm to 50 mm. In this manner, the width of the lower wall guide portion 454 may be larger than the width of the side wall guide portions 451 and 452, and the width of the side wall guide portions 451 and 452 may be larger than the width of the upper wall guide portion 453.

As illustrated in FIG. 6, the lower wall guide portion 454 is disposed above the second portion 415 so as to overlap the second portion 415 of the lower wall first portion 413 in the closed state. Then, the second portion 415 of the lower wall first portion 413 has a region 415a protruding toward the opening portion 420 side from the lower wall guide portion 454 in the planar view illustrated in FIG. 6 in a state where the lower wall guide portion 454 overlaps (a state of being positioned below the lower wall guide portion 454). The protruding region 415*a* is provided on both end portions sides in the width direction of the second portion 415.

As described above, the side wall guide portions 451 and 452, the upper wall guide portion 453, and the lower wall guide portion 454 are continuously formed, and as illustrated in FIG. 4, a region of the opening portion 420 is defined by the rear end portions 451*a* and 452*a* of the side wall guide portions 451 and 452, the lower end portion 453*a* of the upper wall guide portion 453, and the rear end portion 454*a* of the lower wall guide portion 454. That is, a region surrounded by the rear end portions 451*a* and 452*a* of the side wall guide portions 451 and 452, the lower end portion 453*a* of the upper wall guide portion 453, and the rear end portion 454*a* of the lower wall guide portion 454 is the opening portion 420.

As described above, the upper wall guide portion 453 is positioned behind the lower wall guide portion 454 in the front-rear direction (see FIG. 6). In addition, the front end portion 429 of the side wall guide portions 451 and 452 extending so as to couple the lower wall guide portion 454 and the upper wall guide portion 453 has a relatively large area located on the front side (see FIG. 5). The positional relationship of each part indicating the state above will be described. For example, as illustrated in FIG. 6, a first virtual plane 801 that is a virtual plane passing through a midpoint between the upper end portion 420*a* of the opening portion 420 and the rear end portion 454*a* of the lower wall guide portion 454 in the front-rear direction and is orthogonal to the front-rear direction is considered. The first virtual plane 801 like this faces the opening portion 420 above the center of the opening portion 420 in the vertical direction. That is, as illustrated in FIG. 4, a first contact portion 801*x* where the first virtual plane 801 and the opening portion 420 face (are in contact with) is located above a center line 900 passing through the center of the opening portion 420 in the vertical direction. Furthermore, for example, as illustrated in FIG. 6, a second virtual plane 802 that is a virtual plane passing through a midpoint between the upper end portion 420*a* of the opening portion 420 and the front end portion 471 of the lower wall portion 470 in the front-rear direction and is orthogonal to the front-rear direction is considered. The second virtual plane 802 like this faces the opening portion 420 above the center of the opening portion 420 in the vertical direction. That is, as illustrated in FIG. 4, a second contact portion 802*x* where the second virtual plane 802 and the opening portion 420 face (are in contact with) is located above the center line 900 passing through the center of the opening portion 420 in the vertical direction.

Next, functions and effects of the system toilet for pets 1 according to one or more embodiments will be described.

The system toilet for pets 1 according to one or more embodiments includes the excretion container 2 configured to house toilet litter and include the liquid-permeable bottom surface portion 21, the tray 5 disposed below the excretion container 2 and configured to house an absorbent sheet that absorbs a liquid having passed through the bottom surface portion 21, the lower container 3 configured to hold the tray 5, and the hood 4 disposed so as to cover an upper part of the excretion container 2 and formed with the opening portion 420 through which a pet enters and exits, in which the hood 4 includes a pair of the side wall portions 421 and 422 provided so as to face each other on both sides in a width direction of the opening portion 420 and extending in a front-rear direction, the upper wall portion 423 provided above the opening portion 420 so as to bridge over the pair of the side wall portions 421 and 422, the lower wall portion 470 provided below the opening portion 420, and the side wall guide portions 451 and 452 extending rearward and inward in the width direction so as to be folded back from the front end portion 429 of the pair of the side wall portions 421 and 422, and a part of region of the opening portion 420 is defined by the rear end portions 451*a* and 452*a* of the side wall guide portions 451 and 452.

In the system toilet for pets 1 according to one or more embodiments, the opening portion 420 through which a pet enters and exits is formed in the hood 4 covering an upper part of the excretion container 2. In addition, in the hood 4, the side wall guide portions 451 and 452 extending rearward and inward in the width direction so as to be folded back are provided from the front end portion 429 of a pair of the side wall portions 421 and 422 facing each other in the width direction of the opening portion 420 and extending in the front-rear direction, and a part of a region of the opening portion 420 is defined by the rear end portions 451*a* and 452*a* of the side wall guide portions 451 and 452. Since the system toilet for pets 1 like this is configured to extend from the pair of side wall portions 421 and 422 to the opening portion 420 via the side wall guide portions 451 and 452, a pet entering the inside of the toilet from the side wall portions 421 and 422 enters the inside of the toilet while moving the body along the side wall guide portions 451 and 452. For example, in a configuration in which the side wall guide portions 451 and 452 are not provided, when a pet enters the toilet from the side wall portion, the body of the pet hits the side wall portion and the pet may be injured. In this respect, in the system toilet for pets 1 according to one or more embodiments, since the side wall guide portions 451 and 452 extending rearward and inward in the width direction are provided, the pet can enter the inside of the toilet while moving the body along the side wall guide portions 451 and 452 with the surface, and it is possible to effectively suppress the pet from being injured. As described above, according to the system toilet for pets 1 according to one or more embodiments, a pet can enter and exit without damaging the body. In addition, in the configuration in which the pet enters the inside of the toilet while moving the body along the side wall guide portions 451 and 452, since the pet can enter the inside of the toilet with an angle, it is not necessary to perform an angle change (turn) operation inside the toilet which is required when the pet does not enter the inside of the toilet with an angle, and it is possible to provide a toilet space comfortable for the pet. Further, since the side wall guide portions 451 and 452 are provided, when the owner cleans the inside of the toilet, the arm of the owner put in the inside of the toilet hits not the side wall portions 421 and 422 but the side wall guide portions 451 and 452 with the surface, so that it is possible to suppress the arm of the owner from being damaged.

In the system toilet for pets 1, the side wall guide portions 451 and 452 may be formed of the same member as the side wall portions 421 and 422. According to such a configuration, the side wall guide portions 451 and 452 can be easily formed. That is, it is possible to easily obtain a toilet that does not damage the pet.

In the system toilet for pets 1, an angle formed by the side wall portions 421 and 422 and the side wall guide portions 451 and 452 may be an obtuse angle. According to such a configuration, a structure in which the pet enters the toilet while moving the body along the side wall guide portions 451 and 452 can be appropriately realized.

In the system toilet for pets 1 described above, the hood 4 further includes the upper wall guide portion 453 extending downward from the lower end portion 423*a* of the upper wall portion 423 and the lower wall guide portion 454 extending rearward from the upper end portion 424*a* of the lower wall second portion 424 constituting the lower wall portion 470, the side wall guide portions 451 and 452, the upper wall guide portion 453, and the lower wall guide portion 454 are continuously formed, and a region of the opening portion 420 may be defined by the rear end portions 451*a* and 452*a* of the side wall guide portions 451 and 452, the lower end portion 453*a* of the upper wall guide portion 453, and the rear end portion 454*a* of the lower wall guide portion 454. As described above, since the upper wall guide portion 453 and the lower wall guide portion 454 are provided, for example, even for a pet that enters the toilet from the upper wall portion 423 side or the lower wall second portion 424 side (a pet whose head, tail, or the like reaches the upper wall portion 423 or the lower wall second portion 424), the upper wall guide portion 453 or the lower wall guide portion 454 hits the tail or the like of the pet with the surface, and the body of the pet can be appropriately suppressed from being damaged.

In the system toilet for pets 1 described above, the upper wall guide portion 453 may be positioned behind the lower wall guide portion 454 in the front-rear direction. As described above, since the upper wall guide portion 453 is offset rearward, when the pet enters from the opening portion 420, the body and the tail are less likely to come into contact with the upper wall guide portion 453 at the upper portion of the opening portion 430, and it is possible to more effectively suppress the injury of the body of the pet.

In the system toilet for pets 1 described above, the bottom surface portion 21 of the excretion container 2 may be located below the upper end portion 420*a* of the opening portion 420. According to such a configuration, the bottom surface portion 21 of the excretion container 2 can be appropriately disposed in the area where the urine of the pet falls when the pet excretes while having only the upper body out of the opening portion 420.

In the system toilet for pets 1 described above, the first virtual plane 801 that is a virtual plane passing through a midpoint between the upper end portion 420*a* of the opening portion 420 and the rear end portion 454*a* of the lower wall guide portion 454 in the front-rear direction and is orthogonal to the front-rear direction may face the opening portion 420 above a center of the opening portion 420 in the vertical direction. According to such a configuration, since the region located on the front side in the side wall guide portions 451 and 452 that defines the opening portion 420 becomes large, the region in which the pet moves the body along the side wall guide portions 451 and 452 can be enlarged. As a result, the timing at which the pet moves the face along the side wall guide portion 451 or 452 and the timing at which the pet moves the body along the side wall guide portion are likely to be the same, so that the face does not collide with the guide portion earlier than the body of the pet as in the conventional product, and the face and the body come into contact with the guide portion at the same timing, so that it is possible to suppress injury of the pet.

In the system toilet for pets 1 described above, the second virtual plane 802 that is a virtual plane passing through a midpoint between the upper end portion 420*a* of the opening portion 420 and the front end portion 471 of the lower wall portion 470 in the front-rear direction and is orthogonal to the front-rear direction may face the opening portion 420 above a center of the opening portion 420 in the vertical direction. According to such a configuration, since the region located on the front side in the side wall guide portions 451 and 452 that defines the opening portion 420 becomes large, the region in which the pet moves the body along the side wall guide portions 451 and 452 can be enlarged. As a result, the timing at which the pet moves the face along the side wall guide portion 451 or 452 and the timing at which the pet moves the body along the side wall guide portion are likely to be the same, so that the face does not collide with the guide portion earlier than the body of the pet as in the conventional product, and the face and the body come into contact with the guide portion at the same timing, so that it is possible to suppress injury of the pet.

In the system toilet for pets 1 described above, the side wall portions 421 and 422 may extend from a position continuous with the lower wall portion 470 toward a position continuous with the upper wall portion 423 such that the front end portion 429 of the side wall portions is inclined rearward, and the front end portion 429 of the side wall portions 421 and 422 may have the inflection point IP, the rising angle $\alpha$ from the lower wall portion 470 to the inflection point IP may be 30° or more and 90° or less, and the rising angle $\beta$ from the inflection point IP to the upper wall portion 423 may be 60° or more and 90° or less. When the rising angles $\alpha$ of the side wall portions 421 and 422 to the inflection point IP are 30° or more, it is possible to appropriately guide the pet entering the toilet with the body along the side wall guide portions 451 and 452. When the angles of the side wall portions 421 and 422 are 90° or less, the pet can easily enter the toilet from the side of the side wall portions 421 and 422.

In the system toilet for pets 1 described above, the upper end portion 420*a* of the opening portion 420 may be located behind a midpoint CP between the central position TC of the tray 5 and the front end portion 471 of the lower wall portion 470 in the front-rear direction. As described above, in the configuration in which the upper end portion 420*a* of the opening portion 420 is located sufficiently rearward, it is possible to detect contamination of the hood 4 and the like at an early stage even if the owner of the pet does not squat. In addition, the wide opening portion 420 allows the owner to easily clean the hood 4 by putting his/her hand into the opening portion 420. Furthermore, according to such a configuration, since the region located on the front side in the side wall guide portions 451 and 452 that defines the opening portion 420 becomes large, the region in which the pet moves the body along the side wall guide portions 451 and 452 can be enlarged. As a result, the timing at which the pet moves the face along the side wall guide portion 451 or 452 and the timing at which the pet moves the body along the side wall guide portion are likely to be the same, so that the face does not collide with the guide portion earlier than the body of the pet as in the conventional product, and the face and the body come into contact with the guide portion at the same timing, so that it is possible to suppress injury of the pet.

In the system toilet for pets 1 described above, the lower wall guide width that is a length of the lower wall guide portion 454 in an extending direction toward the opening portion 420 may be larger than the side wall guide width that is a length of the side wall guide portions 451 and 452 in the extending direction toward the opening portion 420, and the side wall guide width may be larger than the upper wall guide width that is a length of the upper wall guide portion 453 in an extending direction toward the opening portion 420. In this manner, by making the width wider as the region has the higher possibility that the pet comes into contact with at the time of entry of the pet, it is possible to appropriately guide the pet and appropriately suppress the pet from being injured.

In the system toilet for pets 1 described above, at least one of the side wall guide width, the lower wall guide width, and the upper wall guide width does not necessarily need to be constant in size. According to such a configuration, the width can be adjusted so that the pet can easily moves the body according to the region, and the pet can more easily enter the toilet.

In the system toilet for pets 1, an angle formed by the upper wall portion 423 and the upper wall guide portion 453 may be an obtuse angle. According to such a configuration, it is possible to realize a structure in which the pet is appropriately guided in the opening portion 420 direction by the upper wall guide portion 453. Then, when the pet enters the toilet, for example, when the tail comes into contact with the toilet, the pet comes into contact with the upper wall guide portion 453 with a surface instead of a point, so that it is possible to appropriately suppress the pet from being injured.

In the system toilet for pets 1, the hood 4 may further include a protruding portion 425 at an outer end portion in the width direction of the lower wall portion 470. According to such a configuration, when the pet enters the toilet from the left or right of the opening portion 420 (the outer edge in the width direction), the protruding portion 425 can be used as a step of hooking the legs of the pet, and the pet can more easily enter the toilet.

In the system toilet for pets 1 described above, the hood 4 may be configured to include the fixed hood 41 disposed on a rear side, the movable hood 42 disposed on a front side, and a pair of coupling portions 43 and 43 rotatably coupling the movable hood 42 to the fixed hood 41, the fixed hood 41 may include a pair of connecting portions 412 and 412 extending forward from a place where the pair of coupling portions 43 and 43 is provided, and the lower wall first portion 413 extending in the width direction so as to connect front end portions of the pair of connecting portions 412 and 412, and the movable hood 42 may include the lower wall second portion 424 disposed in front of the lower wall first portion 413, and the lower wall guide portion 454 may be disposed so as to overlap the lower wall first portion 413, and the lower wall portion 470 may be formed by disposing the lower wall second portion 424 in front of the lower wall first portion 413. Since the lower wall portion 470 has the double structure as described above, the pet can be stably supported by the lower wall portion 470, and the pet can more easily enter the toilet.

In the system toilet for pets 1 described above, the lower wall first portion 413 may include a region protruding toward the opening portion 420 side from the lower wall guide portion 454 in a planar view in a state where the lower wall guide portion 454 is overlapped with the lower wall guide. As a result, when the weight of the pet is put on the lower wall guide portion 454, the lower wall guide portion 454 can be appropriately supported by the lower wall first portion 413, and the lower wall guide portion 454 can be prevented from being bent and the pet can be prevented from slipping the legs. In addition, since the lower wall guide portion 454 is supported by the lower wall first portion, the pet can be stably excreted with the legs placed on the lower wall guide portion 454 when excreting facing the entrance side.

Figure 7:
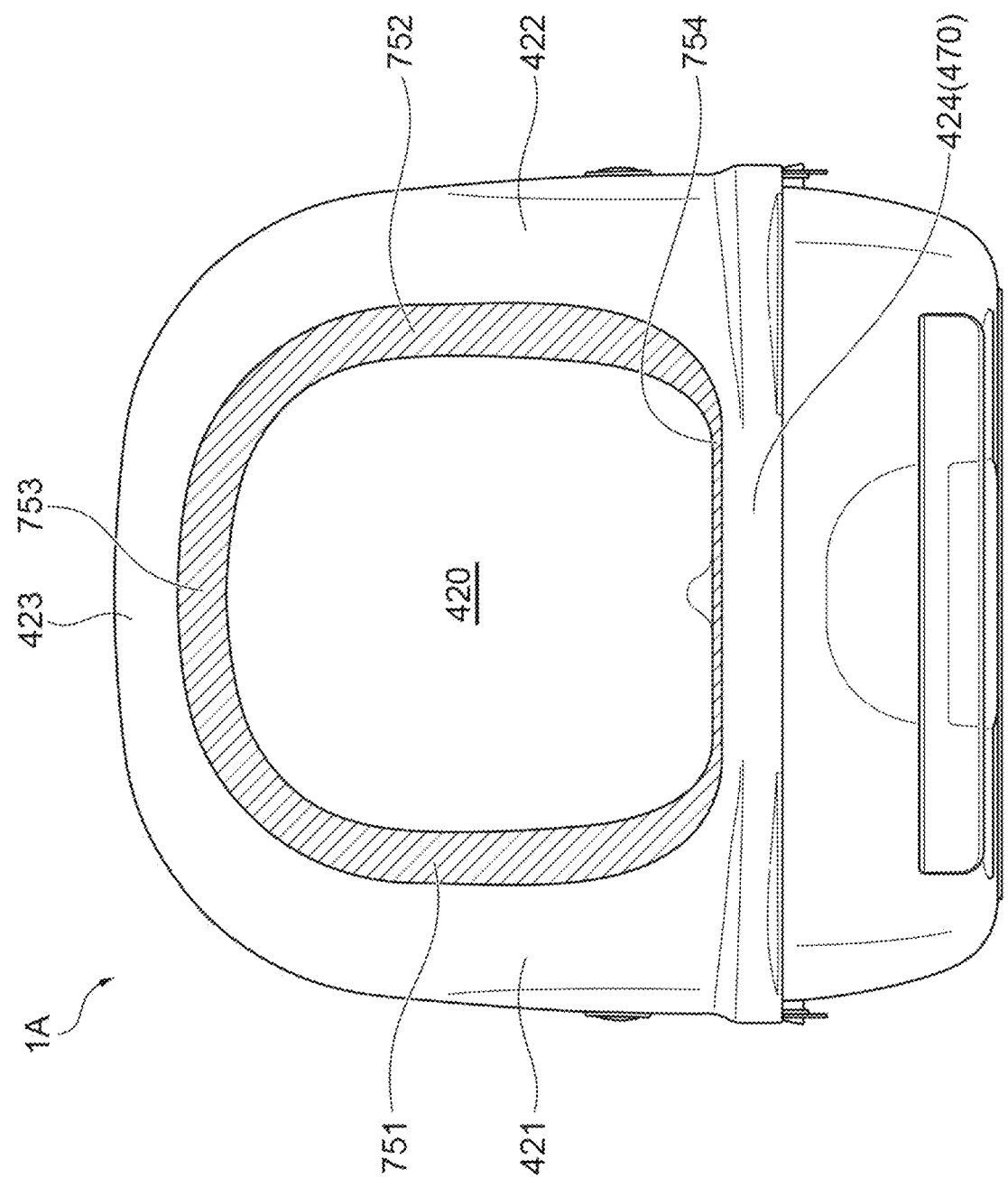
FIG. 7 is a front view of the system toilet for pets according to a modification.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims. For example, it has been described that the side wall guide portions 451 and 452 is formed of the same member as the side wall portions 421 and 422 and the like, but the present invention is not limited thereto. FIG. 7 is a front view of a system toilet for pets 1A according to a modification. In the system toilet for pets 1A illustrated in FIG. 7, side wall guide portions 751 and 752 are configured as a separate member from the side wall portions 421 and 422. More specifically, the system toilet for pets 1A includes an upper wall guide portion 753 and a lower wall guide portion 754. In addition, the side wall guide portions 751 and 752, the upper wall guide portion 753, and the lower wall guide portion 754 are continuously formed, and a region of the opening portion 420 is defined by the rear end portion of the side wall guide portions 751 and 752, the lower end portion of the upper wall guide portion 753, and the rear end portion of the lower wall guide portion 754. The side wall guide portions 751 and 752, the upper wall guide portion 753, and the lower wall guide portion 754 are formed of the same member. That is, the side wall guide portions 751 and 752, the upper wall guide portion 753, and the lower wall guide portion 754 are all configured as members separate from the side wall portions 421 and 422 and the like. The side wall guide portions 751 and 752, the upper wall guide portion 753, and the lower wall guide portion 754 may be formed of, for example, a cushion material known in the art such as plastic, an aggregate of urethane foam or foamed beads, or an aggregate of fibers such as cotton. According to such a configuration, for example, the guide portion of the necessary material can be provided in the necessary portion in accordance with the characteristics of the pet. In addition, the side wall guide portion and the like can be easily replaced.

REFERENCE SIGNS LIST 1, 1A system toilet for pets
2 excretion container
3 lower container
4 hood (upper container)
5 tray
21 bottom surface portion
41 fixed hood
42 movable hood
43, 43 coupling portion
412, 412 connecting portion
413 lower wall first portion
420 opening portion
420a upper end portion
421, 422 side wall portion
423 upper wall portion
423a lower end portion
424 lower wall second portion
424a upper end portion
425 protruding portion
429 front end portion
451, 452 side wall guide portion
451a, 452a rear end portion
453 upper wall guide portion
453a lower end portion
454 lower wall guide portion
454a rear end portion
470 lower wall portion
471 front end portion 751, 752 side wall guide portion
753 upper wall guide portion
754 lower wall guide portion
801 first virtual plane
802 second virtual plane

What is claimed is:

1. A system toilet for a pet, comprising:
an excretion container, including a liquid-permeable bottom surface portion, that houses toilet litter;
a tray, disposed below the excretion container, that houses an absorbent sheet that absorbs liquid having passed through the liquid-permeable bottom surface portion;
a lower container that holds the tray; and
an upper container disposed to cover an upper part of the excretion container and having an opening portion through which a pet enters and exits, wherein
the upper container includes:
a pair of side wall portions disposed to face each other on both sides in a width direction of the opening portion and extending in a front-rear direction that is a depth direction of the upper container;
an upper wall portion disposed above the opening portion to bridge over the pair of side wall portions;
a lower wall portion disposed below the opening portion; and
a side wall guide portion extending rearward and inward in the width direction to be folded back from a front end portion of the pair of side wall portions,
a region of the opening portion is defined by a rear end portion of the side wall guide portion,
the upper container further includes:
an upper wall guide portion extending downward from a lower end portion of the upper wall portion; and
a lower wall guide portion extending rearward from an upper end portion of the lower wall portion,
the side wall guide portion, the upper wall guide portion, and the lower wall guide portion are continuous with each other,
the region of the opening portion is defined by the rear end portion of the side wall guide portion, a lower end portion of the upper wall guide portion, and a rear end portion of the lower wall guide portion,
the upper wall guide portion is disposed behind the lower wall guide portion in the front-rear direction, and
a first virtual plane, passing through a midpoint between an upper end portion of the opening portion and the rear end portion of the lower wall guide portion in the front-rear direction and orthogonal to the front-rear direction, faces the opening portion above a center of the opening portion in a vertical direction orthogonal to the front-rear direction and the width direction.

2. The system toilet according to claim 1, wherein
a lower wall guide width, having a length of the lower wall guide portion in an extending direction toward the opening portion, is larger than a side wall guide width having a length of the side wall guide portion in the extending direction, and
the side wall guide width is larger than an upper wall guide width having a length of the upper wall guide portion in the extending direction.

3. The system toilet according to claim 2, wherein at least one of the side wall guide width, the lower wall guide width, and the upper wall guide width is not constant in size.

4. The system toilet according to claim 1, wherein
the upper container further includes:
a fixed hood disposed on a rear side of the upper container;
a movable hood disposed on a front side of the upper container; and
a pair of coupling portions rotatably coupling the movable hood to the fixed hood,
the fixed hood includes:
a pair of connecting portions extending forward from a place where the pair of coupling portions is disposed; and
a lower wall first portion extending in the width direction to connect front end portions of the pair of connecting portions,
the movable hood includes a lower wall second portion disposed in a front of the lower wall first portion,
the lower wall guide portion is disposed to overlap the lower wall first portion, and
the lower wall portion is structured by disposing the lower wall second portion in the front of the lower wall first portion.

5. The system toilet according to claim 4, wherein the lower wall first portion includes a region protruding toward an opening portion side from the lower wall guide portion in a planar view when the lower wall guide portion overlaps the lower wall first portion.

6. The system toilet according to claim 1, wherein the side wall guide portion is structured with a member same as the pair of side wall portions.

7. The system toilet according to claim 1, wherein the side wall guide portion is structured with a member separate from the pair of side wall portions.

8. The system toilet according to claim 1, wherein an angle formed by one of the pair of side wall portions and the side wall guide portion is an obtuse angle.

9. The system toilet according to claim 1, wherein the liquid-permeable bottom surface portion of the excretion container is disposed below the upper end portion of the opening portion.

10. The system toilet according to claim 1, wherein a second virtual plane, passing through a midpoint between the upper end portion of the opening portion and a front end portion of the lower wall portion in the front-rear direction and orthogonal to the front-rear direction, faces the opening portion above the center of the opening portion in the vertical direction.

11. The system toilet according to claim 1, wherein the upper end portion of the opening portion is behind a midpoint between a central position of the tray and a front end portion of the lower wall portion in the front-rear direction.

12. The system toilet according to claim 1, wherein an angle formed by the upper wall portion and the upper wall guide portion is an obtuse angle.

13. The system toilet according to claim 1, wherein the upper container further includes a protruding portion at an outer end portion of the lower wall portion in the width direction.

14. A system toilet for a pet, comprising:
an excretion container, including a liquid-permeable bottom surface portion, that houses toilet litter;
a tray, disposed below the excretion container, that houses an absorbent sheet that absorbs liquid having passed through the liquid-permeable bottom surface portion;
a lower container that holds the tray; and
an upper container disposed to cover an upper part of the excretion container and having an opening portion through which a pet enters and exits, wherein
the upper container includes:
a pair of side wall portions disposed to face each other on both sides in a width direction of the opening portion and extending in a front-rear direction that is a depth direction of the upper container;

an upper wall portion disposed above the opening portion to bridge over the pair of side wall portions;

a lower wall portion disposed below the opening portion; and a side wall guide portion extending rearward and inward in the width direction to be folded back from a front end portion of the pair of side wall portions, a region of the opening portion is defined by a rear end portion of the side wall guide portion, the upper container further includes:

an upper wall guide portion extending downward from a lower end portion of the upper wall portion; and a lower wall guide portion extending rearward from an upper end portion of the lower wall portion, the side wall guide portion, the upper wall guide portion, and the lower wall guide portion are continuous with each other, the region of the opening portion is defined by the rear end portion of the side wall guide portion, a lower end portion of the upper wall guide portion, and a rear end portion of the lower wall guide portion, the upper wall guide portion is disposed behind the lower wall guide portion in the front-rear direction, one of the pair of side wall portions extends from a position continuous with the lower wall portion toward a position continuous with the upper wall portion such that a front end portion of the one of the pair of side wall portions is inclined rearward, the front end portion of the one of the pair of side wall portions has an inflection point, a rising angle from the lower wall portion to the inflection point is between 30° and 90°, inclusive, and a rising angle from the inflection point to the upper wall portion is between 60° and 90°, inclusive.

* * * * *